United States Patent
Plotkin et al.

(10) Patent No.: US 8,898,452 B2
(45) Date of Patent: Nov. 25, 2014

(54) PROTOCOL TRANSLATION

(75) Inventors: Serge Plotkin, Los Altos Hills, CA (US); Hristo Bojinov, Redwood City, CA (US); Yuval Frandzel, Foster City, CA (US); Andrew Narver, Menlo Park, CA (US); Zi-Bin Yang, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 1585 days.

(21) Appl. No.: 11/222,684

(22) Filed: Sep. 8, 2005

(65) Prior Publication Data

US 2007/0055891 A1    Mar. 8, 2007

(51) Int. Cl.
*H04L 9/00* (2006.01)
*H04L 29/06* (2006.01)
*G06F 21/62* (2013.01)

(52) U.S. Cl.
CPC .......... *H04L 63/162* (2013.01); *G06F 21/6236* (2013.01); *H04L 63/0464* (2013.01)
USPC ............. 713/153; 713/168; 713/170; 380/29; 380/30; 380/277; 380/283

(58) Field of Classification Search
None
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,588,991 A | 5/1986 | Atalla | |
| 4,757,533 A | 7/1988 | Allen et al. | |
| 5,065,429 A | 11/1991 | Lang | |
| 5,150,407 A | 9/1992 | Chan | |
| 5,161,193 A | 11/1992 | Lampson | |
| 5,175,766 A | 12/1992 | Hamilton | |
| 5,185,717 A | 2/1993 | Mori | |
| 5,222,137 A | 6/1993 | Barrett et al. | |
| 5,235,641 A | 8/1993 | Nozawa et al. | |
| 5,235,642 A | 8/1993 | Wobber et al. | |
| 5,265,159 A | 11/1993 | Kung | |
| 5,321,242 A * | 6/1994 | Heath, Jr. | 235/382 |
| 5,677,952 A | 10/1997 | Blakeley, III et al. | |

(Continued)

FOREIGN PATENT DOCUMENTS

| | | |
|---|---|---|
| WO | WO 00/52875 A1 | 9/2000 |
| WO | WO 02/093314 | 11/2002 |

OTHER PUBLICATIONS

Decru, Inc., "Decru Datafort™ Storage Security Appliances", © 2004, 2 pages.

(Continued)

*Primary Examiner* — Kaveh Abrishamkar
(74) *Attorney, Agent, or Firm* — Cesari and McKenna, LLP

(57) ABSTRACT

A system and method for securing data by receiving encrypted data at a security appliance transmitted from a client, wherein at least a portion of the encrypted data is encrypted according to a first encryption protocol, and wherein the encrypted data is transmitted to the security appliance according to a first data transfer protocol. The encrypted data is then decrypted at the security appliance, wherein at least a portion of the decrypted data is re-encrypted according to a second encryption protocol at the security appliance. The re-encrypted data is transmitted from the security appliance to a storage device, wherein the re-encrypted data is transmitted according to a second data transfer protocol that is different than the first data transfer protocol.

34 Claims, 7 Drawing Sheets

(56) References Cited

U.S. PATENT DOCUMENTS

| | | | |
|---|---|---|---|
| 5,687,237 A | 11/1997 | Naclerio | |
| 5,720,034 A | 2/1998 | Case | |
| 5,754,651 A | 5/1998 | Blatter et al. | |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane et al. | |
| 5,983,350 A * | 11/1999 | Minear et al. | 726/11 |
| 6,073,237 A | 6/2000 | Ellison | |
| 6,134,660 A | 10/2000 | Boneh et al. | |
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,600 B1 | 4/2001 | Friedman et al. | |
| 6,236,727 B1 * | 5/2001 | Ciacelli et al. | 380/212 |
| 6,249,866 B1 | 6/2001 | Brundrett | |
| 6,341,164 B1 * | 1/2002 | Dilkie et al. | 380/278 |
| 6,345,101 B1 | 2/2002 | Shukla | |
| 6,356,941 B1 | 3/2002 | Cohen | |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,636,966 B1 | 10/2003 | Lee et al. | |
| 6,684,222 B1 | 1/2004 | Cornelius et al. | |
| 6,708,272 B1 | 3/2004 | McCown et al. | |
| 6,735,693 B1 | 5/2004 | Hamlin | |
| 6,754,827 B1 | 6/2004 | Cane et al. | |
| 6,792,544 B2 | 9/2004 | Hashem | |
| 6,839,437 B1 | 1/2005 | Crane et al. | |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,993,661 B1 | 1/2006 | Garfinkel | |
| 7,003,674 B1 | 2/2006 | Hamlin | |
| 7,020,779 B1 | 3/2006 | Sutherland | |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,146,505 B1 | 12/2006 | Harada et al. | |
| 7,185,192 B1 | 2/2007 | Kahn | |
| 7,206,943 B2 * | 4/2007 | Kobayashi et al. | 713/193 |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,340,500 B2 | 3/2008 | Traversat et al. | |
| 7,603,670 B1 * | 10/2009 | van Rietschote | 718/1 |
| 7,657,736 B2 * | 2/2010 | Godfrey et al. | 713/150 |
| 7,664,796 B2 * | 2/2010 | Powell et al. | 707/812 |
| 7,783,898 B2 | 8/2010 | Detrick et al. | |
| 7,801,993 B2 * | 9/2010 | Shitomi | 709/226 |
| 7,827,406 B2 * | 11/2010 | Brown et al. | 713/170 |
| 2001/0054155 A1 | 12/2001 | Hagan et al. | |
| 2002/0046286 A1 | 4/2002 | Caldwell et al. | |
| 2002/0065924 A1 * | 5/2002 | Barrall et al. | 709/227 |
| 2002/0073324 A1 | 6/2002 | Hsu | |
| 2002/0078341 A1 | 6/2002 | Genty et al. | |
| 2002/0091935 A1 | 7/2002 | Smith et al. | |
| 2002/0114453 A1 | 8/2002 | Bartholet et al. | |
| 2003/0028765 A1 | 2/2003 | Cromer et al. | |
| 2003/0037248 A1 | 2/2003 | Launchbury et al. | |
| 2003/0131193 A1 | 7/2003 | Kodama et al. | |
| 2003/0154399 A1 * | 8/2003 | Zuk et al. | 713/201 |
| 2004/0153642 A1 | 8/2004 | Plotkin et al. | |
| 2005/0033988 A1 | 2/2005 | Chandrashekhar et al. | |
| 2005/0041812 A1 | 2/2005 | Sundararajan et al. | |
| 2005/0080761 A1 | 4/2005 | Sundararajan et al. | |
| 2005/0102498 A1 | 5/2005 | Bojinov et al. | |
| 2005/0177577 A1 * | 8/2005 | Asokan et al. | 707/100 |
| 2005/0238175 A1 | 10/2005 | Plotkin et al. | |
| 2006/0080359 A1 * | 4/2006 | Powell et al. | 707/104.1 |
| 2006/0200570 A1 * | 9/2006 | Stirbu et al. | 709/230 |
| 2007/0038697 A1 * | 2/2007 | Zimran et al. | 709/203 |
| 2007/0058801 A1 | 3/2007 | Plotkin | |
| 2007/0174634 A1 | 7/2007 | Plotkin | |
| 2008/0044023 A1 * | 2/2008 | Zorea et al. | 380/270 |

OTHER PUBLICATIONS

Decru, Inc., "Decru Datafort™ E-Series Storage Security Appliances—Transparent Data Security for Network Attached Storage (NAS)", © 2004, 2 pages.

Decru, Inc., "Decru Datafort FC-Series Storage Security Appliances—Comprehensive Security for Storage Area Networks and Tape Backup", © 2004, 2 pages.

U.S. Appl. No. 11/223,443, filed Sep. 9, 2005, Serge Plotkin.

U.S. Appl. No. 11/223,444, filed Sep. 9, 2005, Serge Plotkin.

U.S. Appl. No. 11/223,445, filed Sep. 9, 2005, Serge Plotkin.

U.S. Appl. No. 11/223,890, filed Sep. 9, 2005, Serge Plotkin.

Anderson et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25. 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS Pub 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS Pub 140-1, "Security Requirements for Cryptographic Modules," Federal Information Processing Standards Publication 140-1, National Institute of Standards and Technology, Jan. 11, 1994, 44 pages.

(56) References Cited

OTHER PUBLICATIONS

Flavin, et al., "Data Protection on Magnetic Media Via an Encrypting Controller," IBM Technical Disclosure Bulletin, vol. 3D, No. 3, pp. 1284-1285 (Aug. 1987).
Garfinkel, S., "PGP: Pretty Good Privacy," O'Reilly & Associates, pp. 43, 54-55, 65-67, 151-153, Jan. 1995.
Garfinkel, S., "Omniva's Self-Destructing Email," Web Security, Privacy and Commerce, Second Edition, O'Reilly & Associates, Inc., Sebastopol, CA, pp. 280-283, Jan. 2002.
Gobioff, Howard, et al., "Security for Networked Attached Storage Devices," Carnegie Mellon Univertsity Computer Science Technical Report CMU-CS-97-185, Oct. 1997, 20 pages.
Gobioff, Howard, et al., "Security for High Performance Commodity Storage Subsystem," Carnegie Mellon Univertsity Computer Science Technical Report CMU-CS-99-160, Jul. 1999, 222 pages.
Gobioff, Howard, et al., "Smart Cards in Hostile Environments," Proceedings of the Second USENIX Workshop on Electronic Commerce, pp. 23-28 (Nov. 18-21, 1996).
Graham, et al, "Data Protection at the Volume Level," IBM Technical Disclosure Bulletin, pp. 146-148, Oct. 1988.
Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).
Hwang, et al., "An Access Control Scheme Based on Chinese Remainder Theorem and Time Stamp Concept," Computers & Security, vol. 15. No. 1. pp. 73-81, 1996.
IBM Crypto Server Management General Information Manual, First Edition (May 2000), 16 pages.
IBM SecureWay Cryptographic Products IBM 4758 PCI Cryptographic Coprocessor Installation Manual, Security Solutions and Technology Department, Second Edition (Mar. 2000), 34 pages.
IBM SecureWay, UltraCypher Cryptographic Engine (Datasheet) (1998), 2 pages.
IBM 4758 PCI Cryptographic Coprocessor Custom Software Installation Manual, Second Edition, Jan. 2001, 31 pages.
Avoid Litigation: Encrypt Your Data, InfoTech Research Group, Sep. 19, 2006, 6 pages.
Johnson et al., "Self-Destructing Diskette," IBM Technical Disclosure Bulletin, vol. 33, No. 1A, pp. 218-219 (Jun. 1990).
Mallett, "Considerations for Applying Disk Encryptors 10 Environments Subject to Hostile Overrun," IEEE, pp. 218-222, 1991.
Mauriello, "TCFS: Transparent Cryptographic File system," LINUX Journal, Aug. 1, 1997, 8 pages.
Menezes et al., "Handbook of Applied Cryptography," CRC Press, Section 13.7.1, 4 pages, 1997.
Moore, "Preventing Access to a Personal Computer," IBM Technical Disclosure Bulletin, pp. 98-100, Sep. 1992.
Omniva Policy Systems, www.omniva.com, (Aug. 2004), downloaded from web.archive.org on Aug. 24, 2004, 19 pages.
Provos, Niels, "Encrypting Virtual Memory," CITI Technical Report 00-3, Center for Information Technology Integration, University of Michigan, Apr. 25, 2000, 11 pages.
Scherzer. "Memory Protection in Chip Cards," IBM Technical Disclosure Bulletin, pp. 416-417, Oct. 1989.
Schneier, "Applied Cryptography Second Edition: Protocols, Algorithms, and Source Code in C," John Wiley & Sons, Inc. pp. 179-181, 185, 213-214, 225, 229, 563-566 and 569. 1996.
Slusarczuk et al., "Emergency Destruction of Information Storing Media," Institute for Defense Analysis, IDA Report R-321 , Dec. 1987, 194 pages.
Smith, "Verifying Type and Configuration of an IBM 4758 Device: A While Paper," IBM T.J. Watson Research Center pp. 1-7 (218/00).
Smith et al., "IBM Research Report: Building a High-Performance, Programmable Secure Coprocessor," IBM Research Division, Computer Science/Mathematics, RC 21102(94393) (Feb. 19, 1998), 61 pages.
Stinson, Douglas R., "Cryptography: Theory and Practice," CRC Press, Mar. 1, 11995, 228 pages.
Vernam, "Cipher Printing Telegraph Systems for Secret Wire and Radio Telegraphic Communications," Journal of the AI EE. pp. 109-115, Feb. 1926.
Weingart, "Physical Security for the uABYSS System," Proceedings 1987 IEEE Symposium on Security and Privacy, pp. 2-58 (Apr. 27-29, 1987), pp. 52-58.
Whitten et al., "Usability of Security: A Case Study," CMU Computer Science Technical Report CMU-CS-98-155. pp. 1-39, Dec. 18, 1998.
Yee et al., "Secure Coprocessors in Electronic Commerce Applications," Proceedings of the First USENIX Workshop of Electronic Commerce, pp. 155-170, Jul. 11-12, 1995.
Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).
Zadok et al., "Cryptfs: A Stackable Vnode Level Encryption File System," Computer Science Department, Columbia University, CUCS-021-98, pp. 1-14, Jun. 1998.

* cited by examiner

PROTOCOL TRANSLATION

BACKGROUND

This disclosure is related to protocol translation and/or data security.

In today's computer networking environment, it is often desirable to safeguard data as it is being transmitted (e.g., data in flight) and/or while it is being stored (e.g., data at rest). Strategies for safeguarding data in flight may differ from strategies for safeguarding data at rest. For example, safeguarding data in flight may utilize temporary key encryption, while safeguarding data at rest may utilize permanent key encryption. Difficulties may arise by applying safeguarding strategies suited for data at rest to data in flight, and vice-versa.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
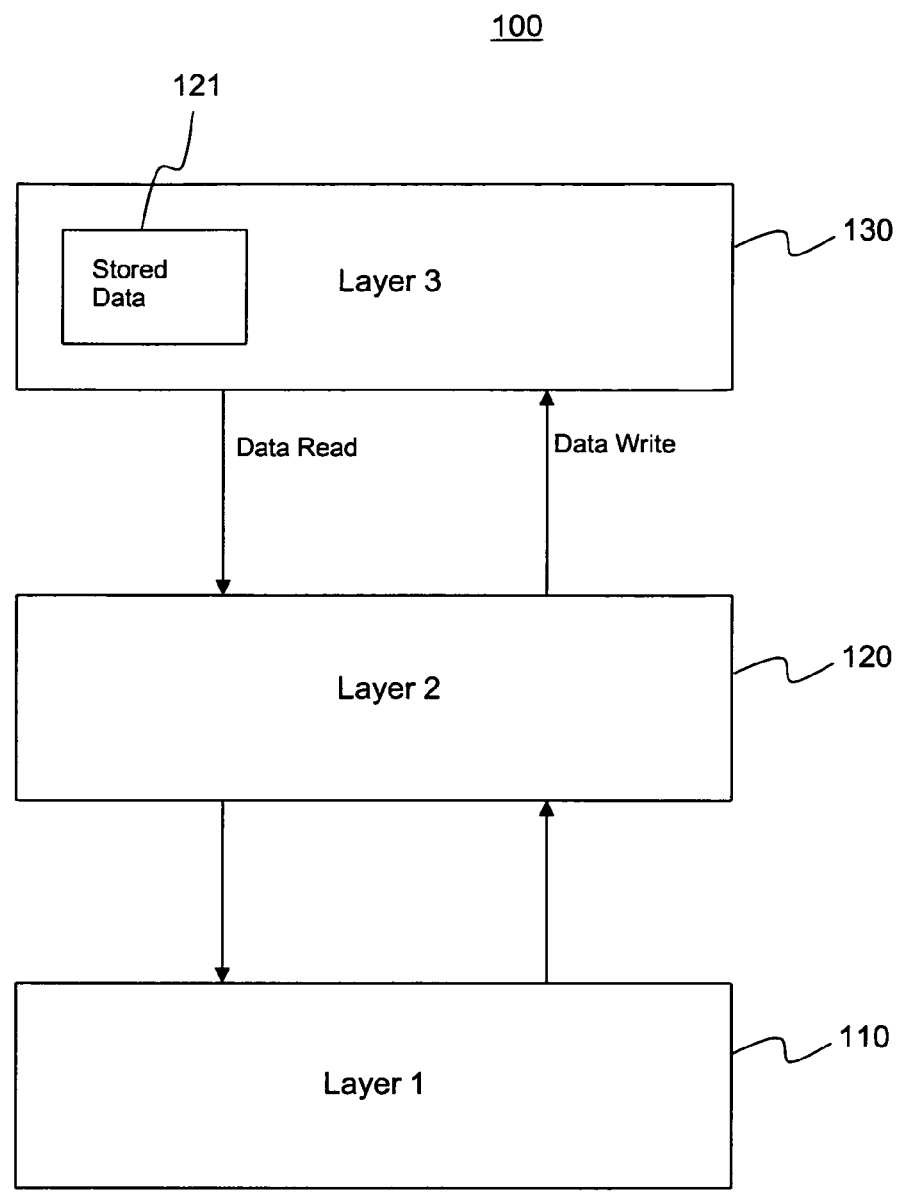
FIG. 1 is a block diagram illustrating an embodiment of an architecture in which an embodiment of a method for translating protocols may be implemented.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As pointed out above, one difficulty with state of the art technology, particularly in networking, for example, includes the possibility for an unauthorized entity and/or individual to gain access to data that may be stored on and/or processed by one or more computing platforms. A need, therefore, exists for techniques and/or systems that may make it more difficult for unauthorized intruders to gain access to such data.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, and/or word processor program that are accessible through a network browser, electronic mail, interactive games, video and/or image processing programs, calendars, financial application software, inventory control systems and/or the like. However, these are merely examples of an application and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual in an organization and/or enterprise that is capable of interacting with applications hosted by information services, enabled with one or more computing platforms for example, provided to individuals in the organization and/or enterprise. In an alternative embodiment, a user may comprise a system, computing platform, application and/or other type of entity capable of interacting with such applications. In another embodiment, a user may comprise an individual and/or entity having administrative rights and/or extra permissions to manage multi-user computing environments. Such users may be referred to as administrators. However, these are merely examples of a user and claimed subject matter is not limited in this respect.

"Stored data" as referred to herein relates to information stored in a storage medium in some retrievable format. In a particular example, a "data storage system" may maintain stored data on one or more storage mediums such as, as identified above, magnetic disk, magnetic tape, and/or semi-conductor devices in a format that is retrievable in response to requests and/or commands. In one particular embodiment, a data storage system may define a file structure that identifies one or more portions of stored data by a file name according to a file and/or directory structure. Alternatively, a data storage system may define a data block structure that associates stored data with one or more locations on a storage medium. However, these are merely examples of how a data storage system may maintain stored data in a retrievable format and claimed subject matter is not limited in this respect.

According to an embodiment, a user and/or application may "access" stored data maintained by a data storage system by interacting with the data storage system in some manner. Here, for example, a user and/or application may access stored data by issuing a command and/or request to a data storage system maintaining the stored data. Such an access may include, for example, a retrieval of one or more portions of stored data in response to a read command from a user and/or application. Such access may also include a modification, erasure and/or addition to one or more portions of stored data in response to a write command from a user and/or application. However, these are merely examples of how a user and/or application may access stored data maintained by a data storage system and claimed subject matter is not limited in these respects.

"Authentication" as referred to herein relates to a process of verifying an identity of an individual and/or entity. Such an identity may be authenticated using any one of several methods such as, for example, comparing an individual's physical appearance with a government issued picture identification document, comparing a username and password entered in a computer system to pre-stored information, comparing provided information with unique known identification information, comparing information from a portable electronic device to a known sequence of numbers, and/or comparing a biometric specimen and/or sample with a biometric signature. However, these are merely examples of methods that may be used for authentication and claimed subject matter is not limited in these respects.

While authentication may verify an identity of an individual and/or entity, such authentication may not necessarily, by itself, determine whether a particular individual and/or entity should have access to a resource, according to a security policy, for example. "Authorization" as referred to herein relates to a process of granting and/or denying a user and/or application, for example, access to a resource. In one particular embodiment, although claimed subject matter is not limited in this respect, an authorization process may determine whether a user and/or application is to have access to stored data and/or portion thereof according to a predetermined policy, typically after successful authentication. However, this is merely an example of an authorization process and claimed subject matter is not limited in this respect.

An "agent" as referred to herein relates to a process that executes on a first device and is capable of communicating with a second device over a network or independently of a network. In one particular embodiment, for example, an agent process may collect information, such as information associated with the first device, a user of the first device and/or program(s) executing on the first device, for example, and enable transmission of the collected information to the second device. In another embodiment, an agent may receive control signals from the second device to take some action in connection with the first device. However, these are merely examples of how an agent may enable communication between devices and claimed subject matter is not limited in these respects.

As discussed previously, difficulties may arise by applying safeguarding strategies suited for data at rest to data in flight, and vice-versa. Therefore, it may be desirable to provide for the utilization of one strategy if data is being transmitted and for the utilization of another strategy if data is being stored. Also, for many applications, it may be desirable to use one protocol to transfer data, but use a different protocol in connection with storing data, for example. As a specific example not intended to limit the scope of claimed subject matter, it may be advantageous for a client computer or client system to read or write data using the Web-based Document Authoring and Versioning (WebDAV) data protocol, but store data using the Network File System (NFS) data protocol. It is noted that throughout this specification the terms data protocol and data transfer protocol are used interchangeably.

For one example embodiment, a mechanism and/or method may be provided whereby data is encrypted using a first encryption protocol and transferred using a first data transfer protocol. Likewise, data may be decrypted, and translated from the first data transfer protocol to a second data transfer protocol. Furthermore, in this particular example, data may also be re-encrypted using a second encryption protocol and delivered to a storage device using the second data transfer protocol. In this manner, for this example embodiment, one data safeguarding strategy may be used if data is transferred and another data safeguarding strategy may be used if data is stored. Further, as alluded to previously, in this example, one data transfer protocol may be used for transferring data and another data transfer protocol may be used for storing the data. Although this example embodiment includes transferring encrypted data, other embodiments are possible in which un-encrypted data is transferred. Similarly, some embodiments may deliver un-encrypted data to a storage device for storage. In one particular embodiment, for example, encrypted data may be transferred, decrypted, and stored at the storage device in an un-encrypted state. Further, for some embodiments, portions of transferred and/or stored data may be encrypted where other portions may not be encrypted. For example, for some embodiments a payload portion of a data may be encrypted where other portions of the data may not be encrypted. For other example embodiments, some metadata (e.g., file names) may be encrypted where the data payload may not be encrypted. It is, of course, noted that claimed subject matter is not limited in scope to these specific example embodiments. These examples are provided merely for purposes of illustration and it is intended that claimed subject matter therefore not be limited to this description.

FIG. 1 is a schematic diagram illustrating an embodiment 100 of a typical architecture in which an embodiment of a technique to control access to stored data is employed, although claimed subject matter is not limited in scope to this particular architecture or embodiment. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, second layer 120 may supplement and/or enhance services that may be available from third layer 130. One service that might be provided by second layer 120 includes security. For example, this may include firewall functionality, such as packet filtering, packet inspection (e.g., stateful and/or stateless), packet format validation, terminating IPSec connections, and/or the like. Another service that might be provided includes data encryption and/or decryption. Without loss of generality, in this context, encryption includes a process in which data is coded so that the content of the data is not capable of being employed and/or understood by a person and/or a device without first being decoded back to the previous form or format it had prior to being encrypted. Thus, decryption, in this context, includes a process of decoding encrypted data back to the form or format it had prior to encryption.

Thus, in this particular example, if first layer 110 requests that data be written, second layer 120 may encrypt the data to be written. The data, once encrypted, may be stored by or at a third layer, such as 130. This is illustrated in FIG. 1 by 121.

Likewise, second layer 120 may, upon another request for services by first layer 110, such as a read request, retrieve the stored, encrypted data from layer three, decrypt it, and provide it to first layer 110. One potential advantage of an embodiment, such as previously described, is that encryption and/or decryption of the data may be made transparent to third layer 130, although it is not necessary that this be the case, even for this embodiment and, thus, claimed subject matter is not limited in scope to embodiments where this is so. Likewise, although claimed subject matter is not limited in scope in this respect, encryption may be also made transparent to first layer 110, e.g., a "consumer" of the services. Likewise, in another embodiment, any two layers, such as first layer 110 and third layer 130, may reside on the same computing platform and even comprise the same layer in some embodiments, although claimed subject matter is not limited in scope in this respect, of course. Also, in other embodiments, any of first layer 110, second layer 120 and/or third layer 130 may reside on multiple computing platforms.

Nonetheless, for such an embodiment, encryption and/or decryption of data stored at or on third layer 130 may not impact operation of layer 130. In this example embodiment, layer 130 may treat data substantially the same regardless of whether or not the data is encrypted. This may provide some benefits, such as making interoperability with other systems possible. Of course, this is just one example of an embodiment of a technique for managing retention and/or discarding of stored data and, as previously stated, claimed subject matter is not limited in scope to such an embodiment. For some embodiments, encryption might be applied only to a payload portion of the transferred data, helping to make the encryption transparent to the storage device.

Further, for this example embodiment, as mentioned earlier, data may be encrypted using a first encryption protocol by first layer 110 and transferred to second layer 120 using a first data transfer protocol. Data may be decrypted and translated from the first data transfer protocol to a second data transfer protocol at second layer 120. As used herein, the terms "translated" and/or "translation" may refer to reformatting data from a format that may be compatible with one data transfer protocol to a format that may be compatible with a different data transfer protocol. Data may also be re-encrypted at second layer 120 using a second encryption protocol and delivered to third layer 130 device using the second data transfer protocol. In this manner, for this example embodiment, one data safeguarding strategy and/or data transfer protocol may be used for transferring data from first layer 110 to second layer 120 and another data safeguarding strategy and/or data transfer protocol may be used for delivering data to and storing data at third layer 130. Of course, this is just one example of an embodiment or a technique for translating protocols and/or securing data and, as previously stated, claimed subject matter is not limited in scope to such an embodiment.

In another example embodiment, data may be encrypted using a first encryption protocol by first layer 110 and transferred to second layer 120 using a first data transfer protocol. Data may be decrypted and translated from the first data transfer protocol to a second data transfer protocol at second layer 120. Data may be delivered without re-encryption and delivered to third layer 130 using the second data transfer protocol.

In another example embodiment, un-encrypted data may be transferred to second layer 120 using a first data transfer protocol. Data may translated from the first data transfer protocol to a second data transfer protocol at second layer 120. Data may be encrypted using any of a wide range of encryption processes, whether now known or to be later developed, and delivered to third layer 130 using the second data transfer protocol.

Depending at least in part on the particular embodiment and/or application, encryption and/or data transfer protocols used if data is being transferred between layers 1 and 2 may be the same as or different from encryption protocols and/or data transfer protocols used if data is being transferred between layers 2 and 3. Further, for some embodiments, data may be transferred among the various layers without encryption.

Figure 2:
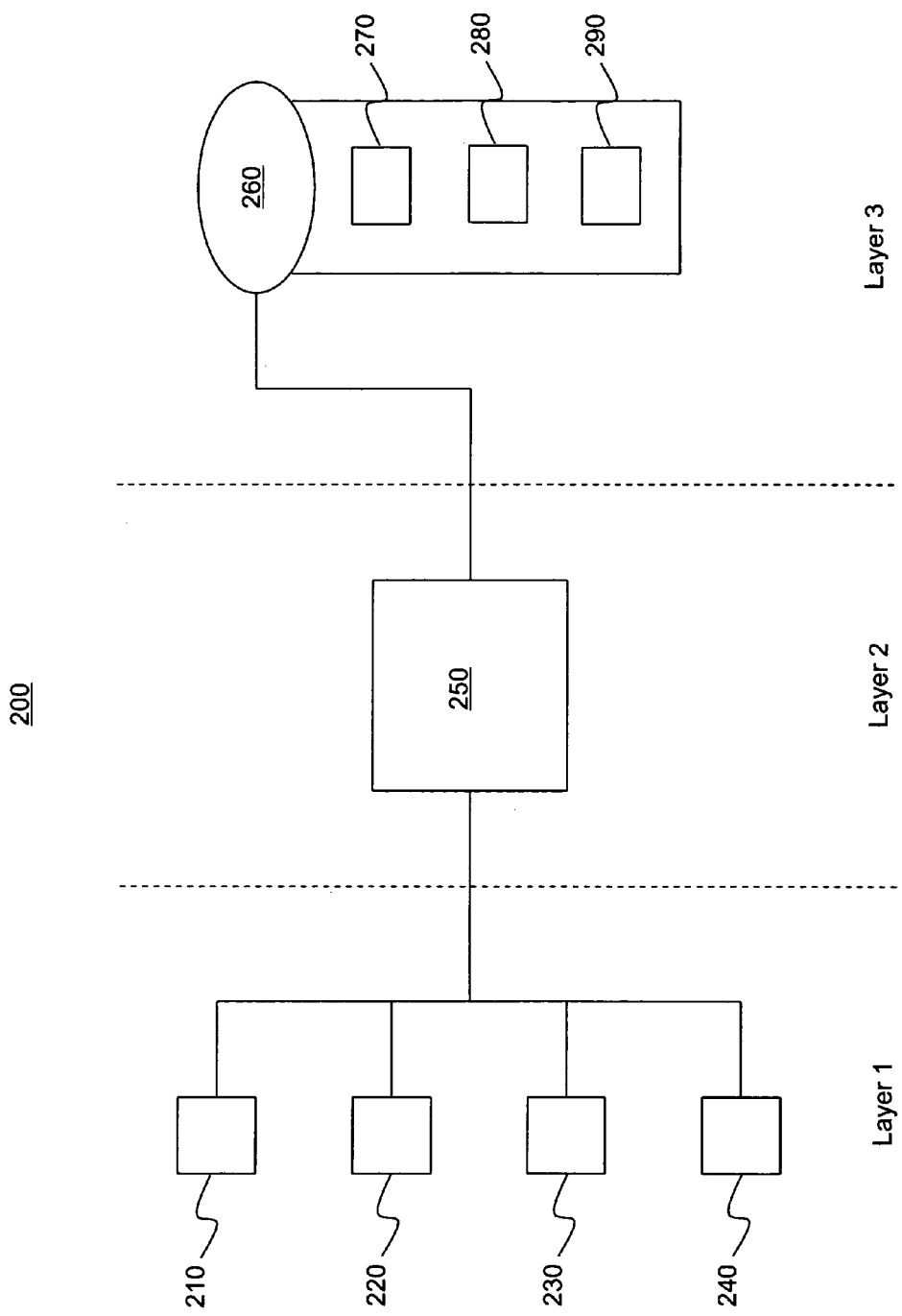
FIG. 2 is a schematic diagram of an embodiment of a portion of a network that may employ an embodiment of a method for translating protocols.

FIG. 2 is a schematic diagram of an embodiment of a portion of a network that may employ an embodiment of a method for translating protocols and/or securing data. For this example embodiment, reference numerals 210, 220, 230 and 240 denote units that access stored data. These may comprise, for example, clients, servers and/or the like. Reference numeral 260 denotes a file server that may store data. For this example embodiment, file server 260 may store encrypted data. Also depicted in FIG. 2 is a directory of file server 260 that includes files respectively denoted 270, 280, and 290. Therefore, as illustrated in FIG. 2, units 210-240 may comprise previously described layer 1, device 250 may comprise previously described layer 2, and server 260 may comprise previously described layer 3. Of course, this is merely an example embodiment and any one of a number of different network architectures may be employed within the scope of claimed subject matter.

For this example embodiment, protocol translation and data storage security may be integrated into a single device 250, if desired, although claimed subject matter is of course not limited in scope to such integration. Device 250 may be referred to as a security appliance. Security appliance 250 may comprise any of a wide range of computing platforms. Security appliance 250 may receive data from units 210-240, and may transfer data to server 260. In this embodiment, data received from units 210-240 may comprise data that has been encrypted by one of units 210-240, and data may be transferred from one of units 210-240 using a particular data transfer protocol. For some embodiments, un-encrypted data may be delivered from any of units 210-240 to appliance 250. At security appliance 250, data received from units 210-240 may be decrypted, if previously encrypted, and translated to comply with a data transfer protocol that is different from the protocol used to transfer data from units 210-240 to security appliance 250. Data may also be re-encrypted using an encryption process that may be different from the process previously used to provide encryption. Data may be transferred to storage server 260 for storage.

The example above included transferring data from units 210-240 to file server 260. The example embodiment of FIG. 2 may also be used to transfer data from file server 260 to any of units 210-240. For example, unit 210 may send a read request to server 260 via security appliance 250. Requested data may be stored in server 260 in an encrypted state. For other embodiments, data may be stored in an un-encrypted state. In response to receiving a read request, server 260 may transfer data to security appliance 250. Within security appliance 250, the data may be decrypted, if previously encrypted, and translated from one data protocol format to another in preparation for transfer to unit 210. Before transferring data to unit 210, data is re-encrypted, possibly using a different encryption process from the process used to encrypt data for storage in server 260. For some embodiments, data may be delivered to unit 210 without re-encryption. Further, although, for this example embodiment, the data transfer protocol used to deliver data from server 260 to security appliance 250 may be different from the protocol used to deliver data from security appliance 250 to unit 210, other embodiments are possible in which the data transfer protocols employed are the same.

For this example embodiment, and other embodiments discussed herein, decryption, protocol translation, and re-encryption services may be performed within security appliance 250. One potential advantage of this example embodiment in which various decryption, translation, and re-encrypting services are performed within one or a limited set of hardware devices is that data security may be improved by not allowing un-encrypted data to be made available apart from the device, such as security appliance 250.

Another potential advantage of at least some of embodiments included within the scope of claimed subject matter includes the ability to use different data transfer and/or security protocols regardless of the direction of data flow with respect to security appliance 250, e.g. whether incoming or outgoing. For example, embodiments are possible within the scope of claimed subject matter in which a more secure protocol may be used to provide data to client systems, while using a less secure, and possibly more efficient protocol to store data on server 260. For some embodiments, security of data on server 260 may be enhanced by encryption; however, encryption may be transparent to server 260.

Any of a wide range of encryption protocols may be utilized in conjunction with embodiments within the scope of claimed subject matter. For example, a temporary key encryption process may be used to secure data transferred between layer 1 devices and security appliance 250, and a permanent key encryption process may be used to secure data transferred between security appliance 250 and layer 3 devices, although claimed subject matter is not limited in these respects.

Also, for this example embodiment, security appliance 250 may be capable of handling a variety of data transfer protocols, such as those used by any or all of units 210. For example, unit 210 may utilize a File Transfer Protocol (FTP) to move data to and from security appliance 250, and unit 220 may use WebDAV to move data to and from appliance 250. For one embodiment, security appliance 250 may use the NFS protocol to transfer data to and from server 260. Security appliance 250 may provide translation between any of a wide range of data transfer protocols. For example, translation may be provided between random-access and stream-based file serving protocols, and/or between file-based and block-based protocols, etc. These are merely example protocol types, and claimed subject matter is not limited in this respect. Other protocol types may include, but are not limited to, Secure Shell File Transfer Protocol (SFTP), Secure Copy Protocol (SCP), Common Internet File System (CIFS), Fibre Channel, Internet Protocol Security (IPSec) and Internet Small Computer System Interface (iSCSI). Data security and/or data transfer protocols, such as those described herein, as well as any of a wide range of other protocols, may be utilized with any of a wide range of embodiments, including the embodiments described herein. Any of these protocols, including any of a wide range of protocols not specifically mentioned, may be used to transfer data between any of the layers 1, 2, and/or 3, or between any devices making up a portion of one or more layers.

Translation from one protocol to another for some embodiments may include more than reformatting data. Some protocols may have rules regarding how one accepts requests, acknowledges requests, etc. For some protocol translations, a single command of one protocol may be translated into a set of commands and/or associated responses in another protocol. Further, some embodiments, more than one layer 2 device may be used to provide services to one or more layer 1 and/or layer 3 devices. Further, some embodiments may include methods to translate authentication of users. For example, for one embodiment, a WebDAV user may be translated into an NFS user. This is merely one example, of course, and claimed subject matter is not limited in this respect.

Figure 3:
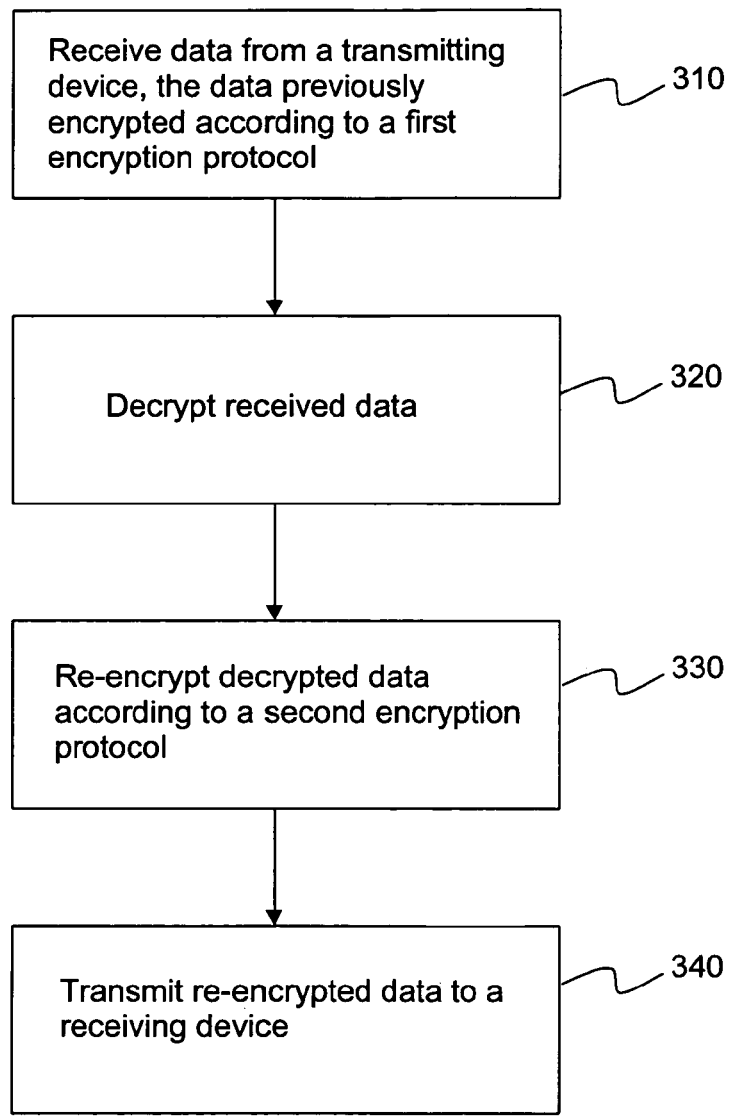
FIG. 3 is a flow diagram of an example embodiment of a method for translating protocols.

FIG. 3 is a flow diagram of an example embodiment of a method for translating protocols. At block 310, data may be received from a transmitting device. For one embodiment, a transmitting device may comprise a client computer system or similar computing device. In another embodiment, a transmitting device may comprise a server computer system or similar computing device, although claimed subject matter is not limited in these respects. Further, for one embodiment, data may be encrypted according to a first encryption protocol before receipt, although for other embodiments data may be un-encrypted. At block 320, received data may be decrypted. At block 330, decrypted data may be re-encrypted according to a second encryption protocol, although for other embodiments data may not be re-encrypted. At block 340, re-encrypted data may be transmitted to a receiving device. For one embodiment, a receiving device may comprise a server computer system or similar computing device, and in another embodiment, a receiving device may comprise a client computer system or similar computing device, although claimed subject matter is not limited in these respects. Further, any of a wide range of encryption processes and/or protocols may be used in connection with this example embodiment. An embodiment in accordance with claimed subject matter may include all, more than all or less than all of blocks 310-340. Furthermore the order of blocks 310-340 is merely one example order, and scope of the claimed subject matter is not limited in this respect.

Figure 4:
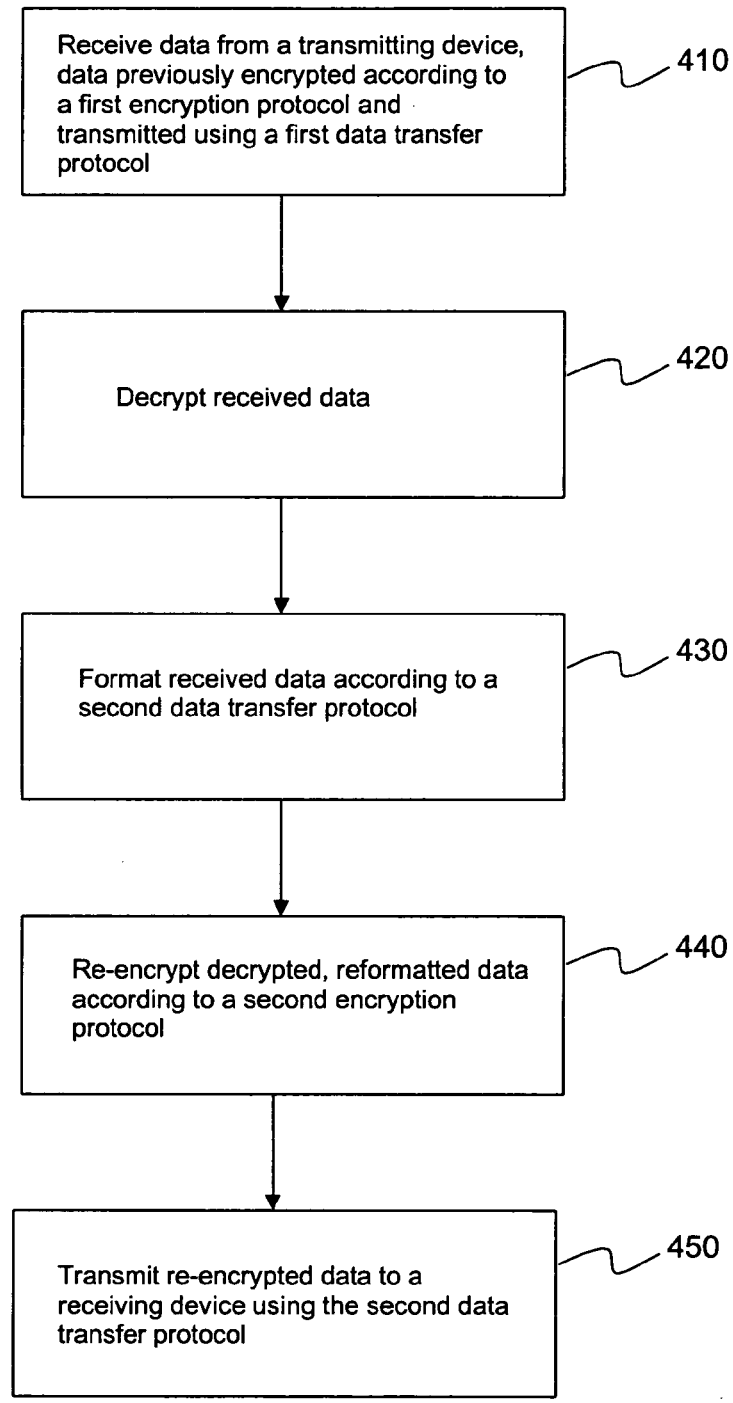
FIG. 4 is a flow diagram of another example embodiment of a method for translating protocols.

FIG. 4 is a flow diagram of another example embodiment of a method for translating protocols. At block 410, data may be received from a transmitting device. For one embodiment, a transmitting device may comprise a client computer system or similar computing device, and in another embodiment a transmitting device may comprise a server computer system or similar computing device, although claimed subject matter is not limited in these respects. Further, for one embodiment, data may be encrypted according to a first encryption protocol before receipt, although for other embodiments data may be un-encrypted. At block 320, received data may be decrypted. At block 430, received, decrypted data may be reformatted to comply with a second data transfer protocol, although for some embodiments data may not be reformatted. In this context, protocol translation may include reformatting data, as discussed previously. At block 440, decrypted, reformatted data may be re-encrypted according to a second encryption protocol and/or process, although, for some embodiments, data is not re-encrypted. At block 450, reformatted, re-encrypted data may be transmitted to a receiving device. For one embodiment, a receiving device may comprise a server computer system or similar computing device, and in another embodiment, a receiving device may comprise a client computer system or similar computing device, although claimed subject matter is not limited in these respects. Further, any of a wide range of encryption and/or data transfer protocols or processes, may be used in connection with this example embodiment. It is noted that in various places through out this specification the terms process and protocol may, depending at least in part on context, be used interchangeably. An embodiment in accordance with claimed subject matter may include all, more than all, and/or less than all of blocks 410-450. Furthermore, the order of blocks 410-450 is merely one example order, and the scope of the claimed subject matter is not limited in this respect.

Figure 5:
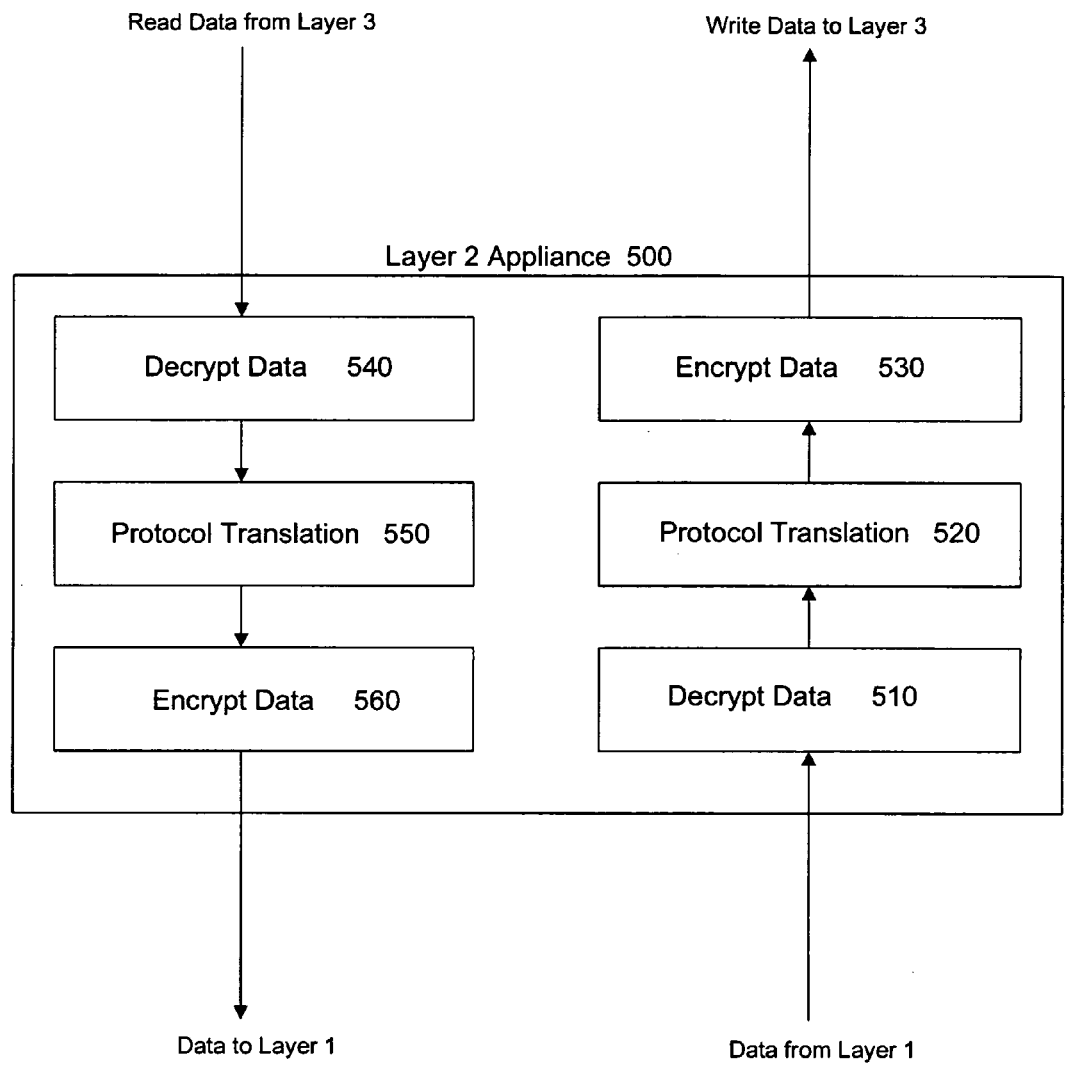
FIG. 5 is a block diagram of an example embodiment of a data storage security device.

FIG. 5 is a block diagram of an example embodiment 500 of a security appliance. Security appliance 500 for one embodiment may comprise a layer 2 device, as described above. Security appliance 500 for this example embodiment may receive and/or transmit data to one or more layer 1 devices. Also, for this example embodiment, appliance 500 may receive and/or transmit data to one or more layer 3 devices. Data from layer 1 may arrive at appliance 500 encrypted according to any of a wide range of encryption protocols and/or processes. For other embodiments, data may be un-encrypted. Data from layer 1 may be decrypted at unit 510 if previously encrypted. Protocol translation operations such as those discussed above may be performed by unit 520. Translated data may be re-encrypted by unit 530 and delivered to one or more layer 3 devices, although for some embodiments data may not be re-encrypted.

Data from layer 3 may arrive at appliance 500 encrypted according to any of a wide range of encryption protocols and/or processes, although for some embodiments data may be un-encrypted. Data from layer 3 may be decrypted at unit 540 if previously encrypted. Protocol translation operations such as those discussed above may be performed by unit 550. Translated data may be re-encrypted by unit 560 and delivered to one or more layer 1 devices, although for some embodiments data is not re-encrypted. Any of a wide variety of data transfer protocols, such as those discussed previously, may be used, for example, to transfer data to and/or from the layer 1 and layer 3 devices. Further, the encryption, decryption, protocol translation, and/or other operations described herein for this embodiment and for other embodiments may be implemented in hardware, software, or firmware, or any combination of hardware, software, or firmware.

Figure 6:
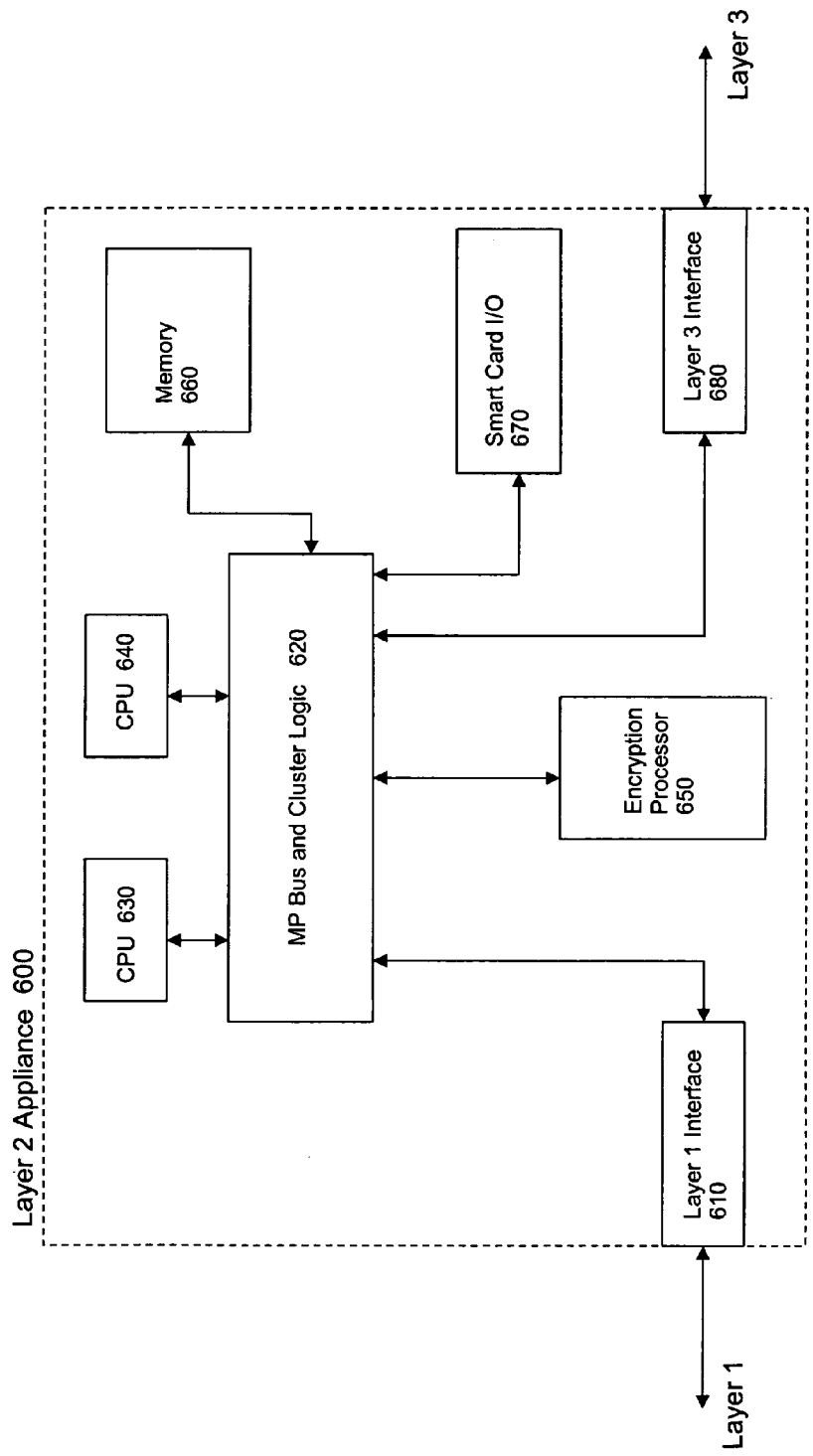
FIG. 6 is a block diagram of another example embodiment of a data storage security device.

FIG. 6 is a block diagram of another example embodiment 600 of a security appliance. Appliance 600 may be used to perform some or all of the various encryption, decryption, and/or protocol translation operations described above. Appliance 600 may include an interface 610 to provide connectivity to layer 1 devices and/or other devices. An interface 680 may also be included to provide connectivity to layer 3 devices and/or other devices. Appliance 600 may also include central processing units (CPU) 630 and 640. CPUs 630 and 640 may be coupled via a multiple processor (MP) Bus and Cluster Logic unit 620. A memory device 660 may also be included. Encryption and/or decryption processes may be performed by an Encryption Processor 650. Protocol translation operations for this embodiment may be implemented as software agents executed by CPUs 630 and 640. For this and other embodiments, 256 bit encryption may be utilized, although claimed subject matter is not limited in this respect. Appliance 600 may further include a Smart Card I/O unit 670. The use of smart cards may assist so that unauthorized administrators are not able configure and/or manage appliance 600. Although FIG. 6 depicts an appliance having particular elements having a particular configuration, other embodiments are possible using a wide range of elements arranged in any of a wide range of possible other configurations.

Figure 7:
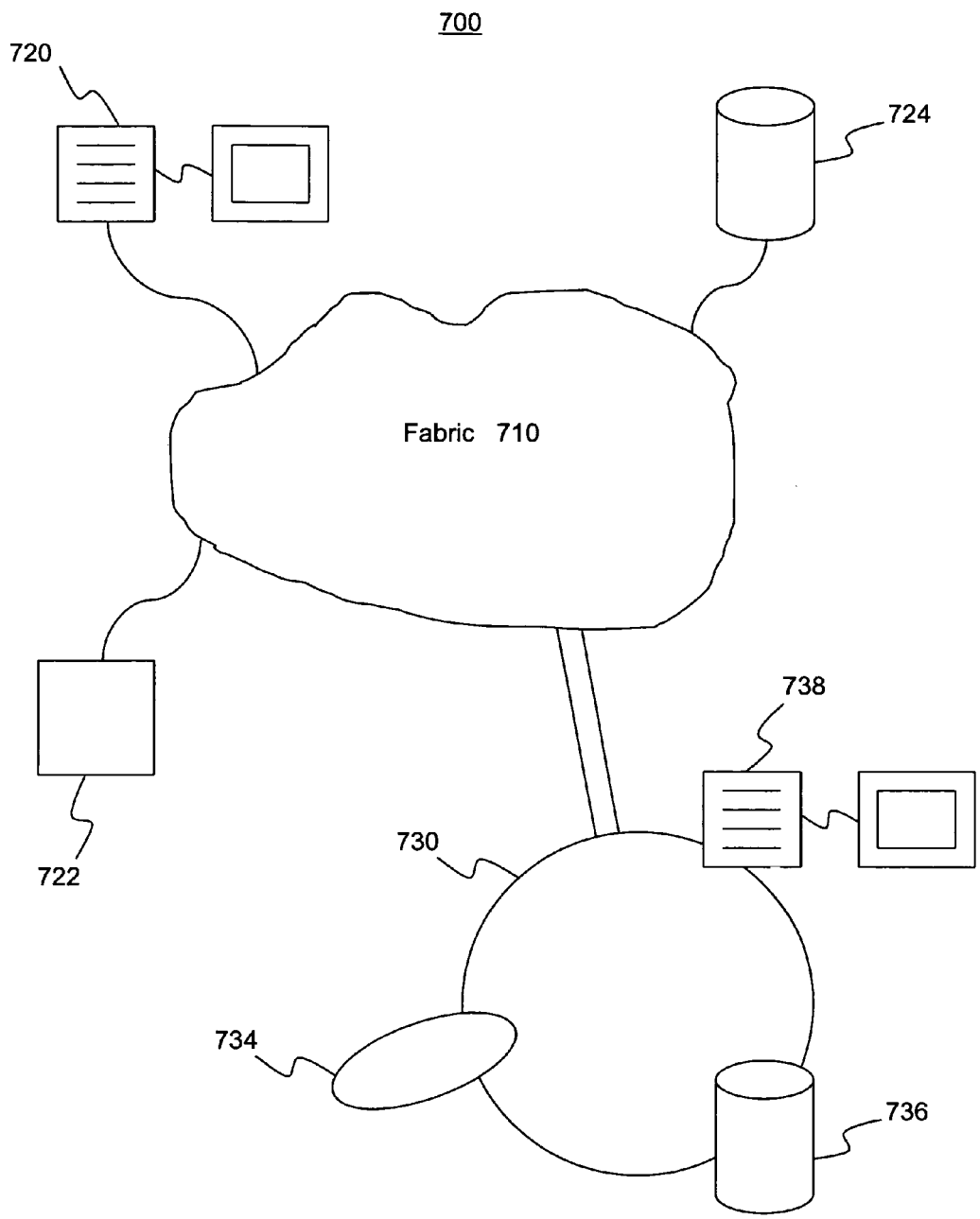
FIG. 7 is a schematic diagram of another embodiment of a network that may employ an embodiment of a method for translating protocols.

FIG. 7 is a schematic diagram of an example embodiment of a communications network or system 700 that may employ an embodiment in accordance with claimed subject matter. In this example, embodiment 700 comprises a switched fabric 710 and a plurality of devices, such as 720, 722, 724, and/or groups of devices, such as 734, 736, and 738, as indicated with respect to logical loop 730, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 710, may be communicatively coupled to various devices, such as, here, 720, 722, and 724, and may operate as a switching network to allow these devices to communicate with each other. Devices 720, 722, and 724 may comprise any type of device, such as, for example, a computing platform, a storage device, and/or the like, and may be communicatively coupled via fabric 710 by employing point-to-point communications technology or techniques, as one example. In this particular embodiment, fabric 710 comprises a variety of communicatively coupled switches. In this particular embodiment fabric 710 is also in communication with logical loop 730. Loop 730 here includes devices 734, 736 and 738. In this particular embodiment, loop 730 comprises an arbitrated loop with ring couplings for providing multiple nodes with the ability to arbitrate access to shared bandwidth. It is, of course, appreciated that this particular embodiment is merely an illustrative example and claimed subject matter is not limited in scope in any way to this particular embodiment.

The following discussion details several possible embodiments for accomplishing this, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method for protocol translation executed on a security appliance, comprising:

receiving a first access request having a first command and a data payload, wherein the first command is formatted according to a first data transfer protocol, wherein the data payload is encrypted according to a first encryption protocol, wherein the first encryption protocol operates at a first layer of a multi-layered protocol stack;

decrypting the encrypted data payload;

translating the first command into a second command formatted according to a second data transfer protocol different than the first data transfer protocol;

re-encrypting the decrypted data payload according to a second encryption protocol different than the first encryption protocol, wherein the second command is not encrypted, wherein the second encryption protocol operates at a second layer of the multi-layered protocol stack different from the first layer; and transmitting a second access request having the second command and the re-encrypted data payload to a server, wherein the second access request is transmitted according to the second data transfer protocol, wherein the re-encryption is transparent to the server.

2. The method of claim 1, wherein the first data transfer protocol comprises a WebDAV protocol.

3. The method of claim 1, wherein the security appliance operates transparent to a client sending the first access request.

4. The method of claim 1, wherein the first command is encrypted.

5. The method of claim 1, wherein the second data transfer protocol comprises a network file system (NFS) protocol.

6. The method of claim 1, wherein the second data transfer protocol comprises a Common Internet File System (CIFS) protocol.

7. The method of claim 1, further comprising:
transmitting the re-encrypted data payload from the security appliance to a second security appliance; and
decrypting the re-encrypted data payload at the second security appliance.

8. The method of claim 1 wherein the first data transfer protocol and the second data transfer protocol are selected from a group consisting of NFS, CIFS, secure shell file transfer protocol (SFTP), secure copy protocol (SCP), and WebDAV.

9. The method of claim 1 wherein the first data transfer protocol is a file-based protocol and the second data transfer protocol is a block-based protocol.

10. The method of claim 1 wherein the first data transfer protocol is a block-based protocol and the second data transfer protocol is a file-based protocol.

11. The method of claim 1 wherein the first data protocol is a stream-based protocol and the second data transfer protocol is a random-access protocol.

12. The method of claim 1 further comprising:
translating the first command into a plurality of second commands formatted according to the second data transfer protocol; and
transmitting the plurality of second commands to the server using the second data transfer protocol.

13. The method of claim 1 further comprising:
statefully inspecting one or more packets having the first command; and
validating the one or more packets.

14. The method of claim 1, wherein the second encryption protocol at the second layer of the multi-layered protocol stack operates transparent to a client sending the first access request.

15. The method of claim 1, wherein the first encryption protocol at the first layer of the multi-layered protocol stack operates transparent to the server.

16. A non-transitory computer readable storage medium containing executable program instructions for execution by a processor, comprising:
   program instructions that receive, at a security appliance, an access request having a first command and a data payload, the access request directed to a storage device, wherein the data payload is encrypted according to a first encryption protocol and received at the security appliance according to a first data transfer protocol, wherein the first encryption protocol operates at a first layer of a multi-layered protocol stack;
   program instructions that decrypt the encrypted data payload at the security appliance;
   program instructions that translate the first command into a second command formatted according to a second data transfer protocol different than the first data transfer protocol;
   program instructions that re-encrypt the decrypted data payload at the security appliance according to a second encryption protocol different than the first encryption protocol, wherein the second command is not encrypted, wherein the second encryption protocol operates at a second layer of the multi-layered protocol stack different from the first layer; and
   program instructions that transmit the second command and the re-encrypted data payload according to the second data transfer protocol from the security appliance to a storage device, wherein the re-encryption is transparent to the storage device such that the re-encrypted data payload is stored at the storage device.

17. The computer readable storage medium of claim 16 further comprising:
   program instructions that translate the first command into a plurality of second commands formatted according to the second data transfer protocol, and
   program instructions that transmit the plurality of second commands to the storage device according to the second data protocol.

18. The computer readable storage medium of claim 17, wherein the first command is encrypted.

19. A system, comprising:
   a security appliance configured to be coupled to transmitting and receiving devices, the security appliance further configured to receive a first access request from the transmitting device, wherein the first access request is directed to the receiving device, wherein the first access request includes a first command and a data payload encrypted according to a first encryption protocol, and wherein the first access request is received at the security appliance according to a first data transfer protocol, wherein the first encryption protocol operates at a first layer of a multi-layered protocol stack;
   the security appliance further configured to decrypt the encrypted data payload;
   the security appliance further configured to translate the first command into a second command formatted according to a second data transfer protocol different than the first data transfer protocol;
   the security appliance further configured to re-encrypt the decrypted data payload according to a second encryption protocol different than the first encryption protocol, wherein the second command is not encrypted, wherein the second encryption protocol operates at a second layer of the multi-layered protocol stack different from the first layer; and
   the security appliance further configured to transmit a second access request having the second command and the re-encrypted data payload to the receiving device, wherein the second access request is transmitted according to the second data transfer protocol, wherein the re-encryption is transparent to the receiving device such that the re-encrypted data payload is received at the receiving device.

20. The system of claim 19, wherein the security appliance is further configured to transmit the re-encrypted data payload to a second security appliance, wherein the second security appliance is configured to decrypt the re-encrypted data payload.

21. The system of claim 20, wherein the second security appliance is further configured to transmit the decrypted data payload to the receiving device according to a third data transfer protocol.

22. The system of claim 19, wherein the first command is encrypted.

23. The system of claim 20 further comprising:
   the security appliance further configured to decrypt the first command, wherein the first command is encrypted according to the first encryption protocol; and
   the security appliance further configured to encrypt the second command according to the second encryption protocol.

24. The system of claim 19, wherein the first data transfer protocol comprises a WebDAV protocol.

25. The system of claim 19, wherein the security appliance is further configured to operate transparent to the transmitting device sending the first access request.

26. The system of claim 19, wherein the second data transfer protocol comprises a network file system (NFS) protocol.

27. The system of claim 19, wherein the second data transfer protocol comprises a Common Internet File System (CIFS) protocol.

28. The system of claim 19 wherein the first data transfer protocol and the second data transfer protocol are selected from a group consisting of NFS, CIFS, secure shell file transfer protocol (SFTP), secure copy protocol (SCP), and WebDAV.

29. The system of claim 19 wherein the first data transfer protocol is a file-based protocol and the second data transfer protocol is a block-based protocol.

30. The system of claim 19 wherein the first data transfer protocol is a block-based protocol and second data transfer protocol is a file-based protocol.

31. The system of claim 19 wherein the first data transfer protocol is a steam-based protocol and second data transfer protocol is a random-access protocol.

32. The system of claim 19 wherein the security appliance is configured to statefully inspect one or more packets having the first command and the security appliance is further configured to validate the one or more packets.

33. The system of claim 19, wherein the second encryption protocol at the second layer of the multi-layered protocol stack operates transparent to the transmitting device.

34. The system of claim 19, wherein the first encryption protocol at the first layer of the multi-layered protocol stack operates transparent to the receiving device.

* * * * *